(12) United States Patent
Tabaru et al.

(10) Patent No.: US 9,971,323 B2
(45) Date of Patent: May 15, 2018

(54) OPTIMIZING DEVICE AND METHOD

(71) Applicant: Azbil Corporation, Tokyo (JP)

(72) Inventors: Tetsuya Tabaru, Tokyo (JP); Shinya Fujie, Tokyo (JP); Souichi Iwamoto, Tokyo (JP); Toru Saito, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 331 days.

(21) Appl. No.: 14/724,986

(22) Filed: May 29, 2015

(65) Prior Publication Data

US 2015/0346704 A1    Dec. 3, 2015

(30) Foreign Application Priority Data

May 30, 2014   (JP) .................................. 2014-112195

(51) Int. Cl.
    *G05B 17/02*    (2006.01)
    *G06F 17/10*    (2006.01)
    *G06F 17/11*    (2006.01)

(52) U.S. Cl.
    CPC .............. *G05B 17/02* (2013.01); *G06F 17/11* (2013.01)

(58) Field of Classification Search
    CPC ................................ G05B 17/02; G06F 17/11
    USPC ........................................................ 700/29
    See application file for complete search history.

(56) References Cited

U.S. PATENT DOCUMENTS 5,347,446 A * 9/1994 Iino ...................... G05B 13/048
                                                          700/29
6,381,505 B1   4/2002 Kassmann et al.

FOREIGN PATENT DOCUMENTS

JP           4614536 B2      1/2011

OTHER PUBLICATIONS

Qin et al. "A survey of industrial model predictive control technology" from "Control Engineering Practice 11 (2003) 733-764".*
Masahiro Ohshima, "Modeled Predictive Control—Birth, Development, and Deployment of the Theory", Measurement and Control, vol. 39, No. 5, pp. 321 to 325, 2000.
Teruo Ishikawa, et al., "Method for Eliminating Bad Parameters in Modeled Predictive Control Have a Steady-State Optimization Function", Journal of Chemical Engineering, vol. 24, No. 1, pp. 24 to 29, 1998.

(Continued)

*Primary Examiner* — Yuhui R Pan
(74) *Attorney, Agent, or Firm* — Oblon, McClelland, Maier & Neustadt, L.L.P.

(57) ABSTRACT

An optimizing device is provided with a target value calculating portion 105 that includes a variable constraint setting portion, a slope constraint setting portion, and a solution calculating portion. The variable constraint setting portion sets constraints for the manipulated variables and control variables. The slope constraint setting portion sets constraints for the slopes for the control variables that include integrating systems. The constraint settings are changed in accordance with the possibility of control variables that include integrating systems going outside of upper and lower limits. The various types of constraints, models for control, and applied optimization evaluating functions that are set/calculated are passed to the solution calculating portion, and optimal target values for minimizing the evaluating function wherein all of the variables are within the constraints are calculated.

8 Claims, 21 Drawing Sheets

(56) References Cited

OTHER PUBLICATIONS

S. Joe Qin, et al., "A Survey of Industrial Model Predictive Control Technology", Control Engineering Practice, vol. 11, pp. 733-764, 2003.
Jan M. Maciejowski (Shuishi Atachi and Masaki Kano, trans.), Modeled Predictive Control—Constraining Factors in Optimal Control Thereof, Tokyo Denki Daigaku Publishing, 2005; and Jan M. Maciejowski, "3.2 Constrained problems—Predictive Control with Constraints", Pearson Education Limited, 2002, pp. 81-88.

* cited by examiner

Background Art

Background Art

Background Art

Background Art

Background Art

Background Art

Background Art

OPTIMIZING DEVICE AND METHOD

CROSS REFERENCE TO RELATED APPLICATION

This application claims priority under 35 U.S.C. § 119 to Japanese Patent Application No. 2014-112195, filed on May 30, 2014, the entire content of which being hereby incorporated herein by reference.

FIELD OF TECHNOLOGY

The present invention relates to an optimizing device and method for optimizing industrial processes such as petroleum refining processes, petrochemical processes, and the like, that are subject to control.

BACKGROUND

In industrial processes as petroleum refining processes, petrochemical processes, and the like, modeled predictive control is known as one multivariable control technique, as a method for controlling multi-input/multi-output dynamic systems.

Modeled predictive control was originally developed as a control technique in processes in multi-input/multi-output systems wherein manipulated variables (the variables inputted to the process) and control variables (the variables outputted from the process) settle on (asymptotically approach) target values while conforming to imposed constraints such as upper and lower limits. In addition to these, at present target values in modeled predictive control are optimized through optimization techniques such as linear programming (hereinafter termed "LP") and quadratic programming (hereinafter termed "QP") for target values in the steady-state of the process. See, for example, the following literatures:

Japanese Patent No. 4614536 (the "JP '536");
Masahiro Ohshima, *Modeled Predictive Control—Birth, Development, and Deployment of the Theory*, Measurement and Control, Vol. 39, No. 5, pp. 321 to 325, 2000;
Teruo Ishikawa, et al. ("Ishikawa"), *Method for Eliminating Bad Parameters in Modeled Predictive Control Have a Steady-State Optimization Function*, Journal of Chemical Engineering, Vol. 24, No. 1, pp. 24 to 29, 1998;
S. Joe Qin, et al. ("Qin"), *A Survey of Industrial Model Predictive Control Technology*, Control Engineering Practice, Vol. 11, pp. 733-764, 2003; and
Jan M. Maciejowski (Shuichi Adachi and Masaaki Kanno, trans.), *Modeled Predictive Control—Constraining Factors in Optimal Control Thereof*, Tokyo Denki Daigaku Publishing, 2005.

An example of such modeled predictive control will be explained below. As illustrated in FIG. 15, a system for performing multivariable modeled predictive control includes a steady-state optimizing portion (optimizing device) 401 and a modeled predictive controlling portion 402 for carrying out calculations in the multivariable modeled predictive control. The steady-state optimizing portion 401 inputs an optimization evaluating function, upper and lower limit constraint values, manipulated variables, control variables, and the like, to calculate optimal target values through an optimization technique such as LP, QP, or the like.

The modeled predictive controlling portion 402 inputs the optimal target values, the control variables, and upper and lower limit values, and the like, to calculate the manipulated variables, and outputs the manipulated variables for the process 403 of the control object. The modeled predictive controlling portion 402 carries out the control calculations (the calculations for the manipulated variables) while taking in consideration upper and lower limit constraints so that the manipulated variables and control variables in the process will converge to optimal target values. The process 403 that is the control object inputs the manipulated variables from the modeled predictive controlling portion 402 and outputs the control variables. The details of specific calculations in the modeled predictive control are given in, for example, Maciejowski, so explanations thereof are omitted here.

The operation of the steady-state optimizing portion 401 will be explained next. As illustrated in FIG. 16, a data collecting portion 404 collects data that is required for predicting a future state of the process 403, data such as the control variables, the manipulated variables, noise variables, and the like, from the process 403 that is the control object. This data is sent to a future predicting portion 405. in the future predicting portion 405, future predicted values for the control variable, and the like, which serve as the basis for target value calculations, are calculated. Typically, values for the control variables at convergence are calculated assuming no change in the values that are inputted into the process 403, such as for the manipulated variables, noise variables, and the like. In other words, the values of the control variables in the steady-state, which will be arrived at if no new operations are carried out in the process 403, are predicted.

The model storing portion 406 stores a mathematical model for the process 403. Examples of mathematical models include transfer function models, state space representation models, and the like. The target value calculating portion 407, based on the future predicted value for the variable in the process 403 (which is normally a predicted variable in the steady-state), the mathematical model for the process 403, and the upper and lower limit constraints on the variables, uses LP or QP to calculate target values for optimizing the given optimization evaluating function. These values are passed to the modeled predictive controlling portion as optimal steady-state target values.

The process by which the target value calculating portion 407 determines the target values through LP or QP will be explained in greater detail next. In the below, $u_1, u_2, \ldots, u_m$ indicate values of manipulated variables, and $y_1, y_2, \ldots, y_n$ indicate values of control variables. The number of manipulated variables is m, and the number of control variables is n. k is an index indicating the current control interval. When a set of control variables and manipulated variables is treated as a vector, they are notated as shown the Equation (1). Moreover, when the control variables and manipulated variables are treated as a single vector, then it is expressed as x, as shown in Equation (2).

Expression 1

$$u=[u_1,u_2,\ldots,u_m]^T, y=[y_1,y_2,\ldots,y_n]^T \qquad (1)$$

$$x=[u^T,y^T]^T \qquad (2)$$

A method for carrying out optimization on a deviation from a base point, using, as the base point, the variable values in the steady-state, calculated by the future predicting portion 405, will be explained below (where this will be termed "differential optimization" below). For example, the JP '536 describes a method for calculating target values for the steady-state of the system that is the object of modeled predictive control, in the JP '536, and in the JP '536, differential optimization calculations are carried out. Moreover, Ishikawa argues for a method for determining the optimal target values through LP, but it is differential optimization that is used in Ishikawa as well.

Even here, this is handled primarily as differential optimization. Note that the present invention itself is not limited to differential optimization, but rather can be applied to optimization that is not differential optimization.

One example wherein differential optimization is expressed in an equation is presented. An equation is set up by the future predicting portion calculating a convergence value $y(\infty)$ as a base point, assuming that the manipulated variables have values of $u(k-1)$ one control interval earlier, and that the control variables derive from the manipulated variables, and then using differences $\Delta u$ and $\Delta y$ from the base point. The relationships between u, y, $\Delta u$, $\Delta y$, $u(k-1)$ and $y(\infty)$ will be as given in Equation (3), below.

Expression 2

$$u=u(k-1)+\Delta u, y=y(\infty)+\Delta y$$

$$u(k-1)=[u_1(k-1),u_2(k-1),\ldots,u_m(k-1)]^T, y(\infty)= [y_1(\infty),y_2(\infty),\ldots,y_n(\infty)]^T$$

$$\Delta u=[\Delta u_1,\Delta u_2,\ldots,\Delta u_m]^T, \Delta y=[\Delta y_1,\Delta y_2,\ldots,\Delta y_n]^T,$$
$$\Delta x=[\Delta u^T,\Delta y^T] \quad (3)$$

This will be explained below in accordance with FIG. 17. The variable steady-state predicted values are values for the process variables in the steady-state, calculated by the future predicting portion, corresponding to $u(k-1)$ and $y(\infty)$ in the equation above. The upper and lower limit constraints are upper and lower limit values on the steady-state target values of the variables. Here the variable values that are underlined express lower limits, and those that are overlined express upper limits. An equation that is to be satisfied by $u_i$ (the $i^{th}$ manipulated variable), for example, is as follows:

Expression 3

$$\underline{u_i} \leq u_i \leq \overline{u_i} \quad (4)$$

The constraints to which the manipulated variables and control variables must comply are determined by the steady-state variable constraint setting portion 471. Generally, constraints are set as parameters wherein each of the variables must comply with lower limits and upper limits. When differential optimization is performed, constraint equations are set up for differences from the base point, as in Equation (5), and passed to the solution calculating portion 472.

Expression 4

$$\underline{u_i}-u_i(k-1) \leq \Delta u_i \leq \overline{u_i}-u_i(k-1), \text{ for } i=1,\ldots,m$$

$$\underline{y_i}-y_i(\infty) \leq \Delta y_i \leq \overline{y_i}-y_i(\infty), \text{ for } i=1,\ldots,n \quad (5)$$

The optimization evaluating function is an evaluating function for LP or QP. Typically, it is provided as a function that is to be minimized (where if the optimization object is to be maximized, then a minimization problem can be produced through applying an evaluating function wherein the signs are reversed). In the case of differential optimization, an evaluating function $J(\Delta x)$ is applied as illustrated in Equation (6), below.

Expression 5

$$J(\Delta x)=\Delta x^T H \Delta x + h^T \Delta x \quad (6)$$

If here H is non-zero, then this is QP, but if zero, this is LP. Note that if the evaluating function is given as a function of x, as opposed to a function of $\Delta x$, then Equation (3) can be used to convert into the form in Equation (6).

The model that is the control object provides a model for obtaining equations giving the relationships between the manipulated variables and the control variables. If using differential optimization, then it is assumed that the magnitudes of changes $\Delta y$ in the control variables are proportional to the magnitudes of changes $\Delta u$ in the manipulated variables, which is typically expressed as in Equation (7), below.

Expression 6

$$\Delta y = G_0 \Delta u \quad (7)$$

The $G_0$ in Equation (7) is the model that is the control object. To expand on this, it is also a gain matrix (n rows×m columns). For example, if a transfer function model that is the control object is G(s), then the gain matrix can be calculated by assuming $G_0=G(0)$.

A solution calculating portion 472 calculates $\Delta x$ of so as to minimize the evaluating function of Equation (6) in a range that satisfies the parameters of Equation (5) and Equation (7). The optimal solution that is produced is a difference from the base point $(u(k-1), y(\infty))$, so the final optimal steady-state target value can be obtained by adding this value to the base point. Note that the techniques themselves for solving this optimization problem are known technologies.

Note that the specific method for calculating in the target value calculating portion 407 is not limited to the above, but rather a different calculating process is also possible. For example, while in the above the constraints on the manipulated variables and control variables were defined through limitation to being within upper and lower limit values, there are also other methods. For example, there is a method wherein penalties that depend on the magnitude of deviation of the control variables from the upper and lower limit values are added to the evaluating function described above. In the case of this method, the control variables are allowed to deviate outside of the upper and lower limit values, but the greater the magnitude of the deviation, the greater the value of the evaluating function, thus suppressing the magnitude of the deviation.

Note that here the term "constraint" includes both a meaning wherein no deviation whatsoever outside of the upper and lower limit values or from the setting values is allowed, and a meaning wherein deviations outside of the upper and lower limit values or from the setting values are allowed, but suppressed through penalties. Moreover, the constraints are of the type wherein deviations outside of the upper and lower limit values, or from the setting values, are not allowed are termed "hard constraints" and constraints of the type where such deviations are allowed are termed "soft constraints." In a case of soft constraints, deviations outside of the original upper and lower limit values and from the setting values are allowed, and thus the solution might not satisfy those conditions. Here these cases are included in the expression "satisfaction of constraints" but it should be noted that, in actuality, that which is satisfied is a constraint that is broader than the original "upper and lower limit values" and "setting values."

Note that there is one problem in the method explained up until this point. This is a problem in that this method cannot be used when the process includes an integrating element.

An integrating element is an element wherein the output is proportional to a time-based integral of the input.

Expressed in terms of a transfer function, this is K/s. The use of a tank will be explained as an example of a dynamic system that has an integrating element (hereinafter termed an "integrating system"). When it is assumed that the volume of a fluid within a tank is y1, the flow rate of the inflow is u1, and the flow rate of the outflow is u2, then these relationships can be expressed as in Equation (8), below. If one considers the flow rate of the inflow and the flow rate of the outflow as inputs to the system and the volume as the output, this system is an integrating system.

Expression 7

$$y_1(t) = \int_0^\tau (u_1(t') - u_2(t'))dt' + y_1(0) \quad (8)$$

Insofar as the inputs are not zero, then the outputs of the integrating elements will not be constants. Because of this, the output of the integrating system will change continuously, rather than being a constant value. For example, in terms of the example of the tank, if the flow rate of the inflow and the flow rate of the outflow are not in equilibrium, then there will be continuous change in the volume of fluid in the tank. In a state wherein the flow rate for the inflow is continuously greater than the flow rate for the outflow, then the fluid within the tank will overflow, but if it is the flow rate of the outflow that is the greater, then eventually the tank will become empty. Of course, normally control is required to prevent this from happening.

Even in actual processes, there are those that have integrating elements, and these may be subject to optimization. However, the techniques described above cannot be applied as-is to these processes. The reason for this is that when the process includes an integrating element, $G_0$ will be unbounded. This is because the transfer function of the integrating element is K/s, which goes to infinity when s=0. Because of this, the techniques for optimizing processes that include integrating elements are different from normal. For example, Section 3.3.4 (Page 753) of Qin describes two methods as techniques for steady-state optimization of processes that have integrating elements, written for industrial application of modeled predictive control.

One is a method that adds a parameter that the slope of the control variable that includes the output of the integrating element (hereinafter termed a "control variable that includes an integrating system") be zero. This configuration is illustrated in FIG. 18. The difference from a configuration when there is no integrating element that is a control object is the addition of the integrating system slope predicting portion 408. Here the values to which the slopes of the control variables included in the integrating system converge are predicted assuming no changes in the inputs into the processes. The target value calculating portion 407 determines target values so that the sums of the magnitudes of changes for it these values and for the slopes of the control variables will always be zero.

One example is illustrated below. The control variables are expressed as $y_1$ and $y_2$ and the manipulated variables are expressed as $u_1$ and $u_2$, where there is no integrating element in the transfer function from $u_1$ and $u_2$ to $y_1$, and where the transfer function from $u_1$ and $u_2$ to $y_2$ includes an integrating element. Moreover, the slope of $y_2$ is expressed as $y_2^{(SL)}$. Given these assumptions, Equation (9), wherein the optimizing calculation for finding the target values is formed into an equation, is given below.

Expression 8

$$u(k-1) = [u_1(k-1), u_2(k-1)]^T, y(\infty) = [y_1(\infty)]^T$$

$$\Delta u = [\Delta u_1, \Delta u_2]^T, \Delta y = [\Delta y_1]^T$$

$$\Delta x = [\Delta u^T \Delta y^T]^T$$

$$J(\Delta x) = \Delta x^T H \Delta x + h^T \Delta x$$

$$\Delta y = [G_{1,1}(0) G_{1,2}(0)] \Delta u$$

$$\underline{u_i} - u_i(k-1) \leq \Delta u_i \leq \overline{u_i} - u_i(k-1), \text{ for } i=1,2$$

$$\underline{y_1} - y_1(\infty) \leq \Delta y_1 \leq \overline{y_1} - y_1(\infty) \quad (9)$$

In the equations up to this point, there are essentially no differences from Equations (5) through (7) except for $y_2$ being outside the scope of application. In addition to this, the following new equation, Equation (10) is added.

Expression 9

$$y_2^{(SL)}(\infty) + \Delta y_2^{(SL)} = 0 \quad (10)$$
$$\Delta y_2^{(SL)} = S \Delta u$$
$$S = \lim_{s \to 0} s[\, G_{2,1}(s) \quad G_{2,2}(s) \,]$$

Here $y_2^{(SL)}(\infty)$ is the value that is predicted by the integrating system slope predicting portion. In this value, the term that adds the magnitude of change $\Delta y_2^{(SL)}$ of the slope of $y_2$ that is produced through the magnitude of change $\Delta u$ of u is the left side of the first line of Equation (10), where this is added as a parameter that must be satisfied being equal to zero. Note that $G_{j,i}(s)$ indicates the transfer function from the manipulated variable i to the control variable j.

The operation of the target value calculating portion 407 will be explained again using FIG. 19. The points of difference for the maximum when there is no integrating system are the slope gain matrix calculating portion 474 and the slope upper and lower limit setting portion 475. Note that the target value calculating portion 407 is provided with a steady-state gain matrix calculating portion 473. The slope upper and lower limit setting portion 475 corresponds to the first and second lines in Equation (10), and sets the upper and lower limits on the slopes of control variables that include an integrating system. Generally, as in the right side in Equation (10), the upper limit=the lower limit=0. The slope gain matrix calculating portion 474 calculates a matrix that defines the relationship between $\Delta u$ and the magnitude of change $\Delta y_2^{(SL)}$ in the slope of $y_2$, that is, the matrix S in the third line in Equation (10). $\Delta x$ that minimizes the evaluating function $J(\Delta x)$ is calculated based on Equation (9) by the solution calculating portion 472. The process for obtaining the optimal steady-state target value based on Equation (9) by the solution calculating portion 472 is fundamentally the same as in the conventional technology. Doing this makes it possible to perform optimization even for a process that includes an integrating element.

The other method is shown in Qin is one wherein a term that is proportional to the size of the slope of the control variable that includes the integrating system (for example, the square of the slope) is added, as a penalty function, to the evaluating function that is to be optimized. The overall structure is the same as in the method described above, but, as illustrated in FIG. 20, there is one difference from the structure in the target value calculating portion 407.

The slope penalty setting portion 475a sets a penalty function in relation to the slope of the control variable that includes the integrating system. The penalty function is defined as P(Δx), and is expressed by Equation (11).

Expression 10

$$P(\Delta x) = p(y_2^{(SL)}(\infty) + \Delta y_2^{(SL)})^2 = p(y_2^{(SL)}(\infty) + S\Delta u)^2 \quad (11)$$

The meanings of $y_2^{(SL)}(\infty)$, $\Delta y_2^{(SL)}$, $\Delta u$, and S are the same as in the example described above. p is a constant that determines the size of the penalty. This Equation (11) means that a penalty is applied that is proportional to the square of the slope of $y_2$.

Moreover, the solution calculating portion 472 is provided with an evaluating function correcting portion 473a, where the evaluating function correcting portion 473a adds a penalty function P(Δx) wherein a slope penalty setting portion is provided in the evaluating function J(Δx) that is applied, to produce a new evaluating function. This evaluating function is used in the solution calculating portion 472 instead of J(Δx). When the evaluating function after correction is expressed by $J_{modified}(\Delta x)$, the result is an equation such as: "$J_{modified}(\Delta x) = J(\Delta x) + P(\Delta x) \ldots (12)$"

The solution calculating portion 472 calculates the Δx that minimizes $J_{modified}(\Delta x)$. Because of this, if the constant P relating to the penalty term is set at an adequately large value, then reducing the slope of the control variable will take priority over minimizing the actual evaluating function. As a result, it is possible to obtain a target value wherein the given optimization evaluating function is as small as possible while keeping the value of the slope of the control variable adequately small.

The use of these methods makes it possible to optimize the target value in a steady-state even in a process that is an integrating system.

However, in the methods described for the conventional technology there is a problem in that it is not possible to obtain the optimal solution even when a better optimal target value actually exists. For example, let us consider a process that has an integrating element, with one manipulated variable and one control variable, as illustrated in Equation (13), below:

Expression 11

$$y_1(t) = \int_0^t (u_1(t') - d) dt' \quad (13)$$

In Equation (13), $u_1$ is a manipulated variable (input), $y_1$ is a control variable (output), and d is a constant in the process. Here the optimization object is that of minimizing the manipulated variable $u_1$. If this process behaves strictly in accordance with Equation (13), then the solution by the conventional technology will be $u_1 = d$, or a value near thereto. This is because if the value of $u_1$ is other than d, then $y_1$ will have a slope, and the conventional technology determines a target value so this does not occur.

However, in an actual process, unlike the assumption described above, the behavior is not always in accordance with Equation (13). For example, there are also processes that have nonlinear characteristics, such as d being dependent on the control variable $y_1$, such as in Equation (14), below.

Expression 12

$$y_1(t) = \int_0^t (u_1(t') - d(y_1)) dt' \quad (14)$$

Here let us assume that the process has the characteristic of the value of d also falling monotonically with a reduction in $y_1$, as illustrated in FIG. 21. For example, if d is 10 when $y_1$ is 400 but d goes to 8 when $y_1$ goes to 80, then this is a process wherein there is a positive correlation between $y_1$ and d. Moreover, let us assume that the lower limit values for $u_1$ and $y_1$ are, respectively, 8 and 80, and the current values are 10 and 100. In this case, in the conventional technology, the optimal target value is determined based on the current estimated value of the slope of $y_1$, and thus the target value for $u_1$ will be 10.

However, in actuality, if $u_1$ were controlled so as to be smaller than 10, that is, if $u_1$ and $y_1$ were to be reduced gradually along the heavy line as illustrated in FIG. 21, then the value of $u_1$ that causes the slope of $y_1$ to go to zero would also become smaller, making it possible to further optimize the target value for $u_1$. If such control were to be continued, then, ultimately, it would be possible to reduce the target value for $u_1$ to 8. Summarizing the above, in a case wherein d is dependent on $y_1$, optimization of the target value is not possible in the conventional technology; in other words, there is still room for further optimization. In this way, conventionally there is a problem in that appropriate control that reflects the actual characteristics of the control object has not been possible.

The present invention was created in order to eliminate problem areas such as set forth above, and an aspect thereof is to be able to control more appropriately given the actual characteristics of the control object.

SUMMARY

An optimizing device according to the present invention includes: a data collecting portion that collects data on a control object including a manipulated variable used in controlling the control object and a control variable for outputting the control object; a model storing portion that stores a mathematical model of the control object; a future predicting portion that predicts a value, after a prescribed time, for at least a control variable that does not include an output of an integrating element, of the optimization object variables that are the optimization objects from among the data collected by the data collecting portion; an integrating system slope predicting portion that predicts a magnitude of change per unit time, after a prescribed time, for those control variables that include an output of an integrating element; a variable constraint setting portion that sets a constraint for a value of a variable that is an optimization object, after a prescribed time; a slope constraint setting portion that sets a constraint on the magnitude of change after a prescribed time for a control variable that includes an output of an integrating element; and a solution calculating portion that calculates an optimal solution for the variables that are subject to optimization, satisfies the constraints set by the variable constraint setting portion and the slope constraint setting portion, and optimizes the optimization evaluating function that is applied; wherein: the slope constraint setting portion changes a slope constraint depending on a collected value or a predicted value for a control variable for which a slope constraint is set, to set, when the possibility of the control variable going outside of the constraints that are set by the variable constraint setting portion is low, to a slope constraint that is more relaxed than a slope constraint when the possibility is high.

In this optimizing device, the slope constraint setting portion may set, as constraints, upper and lower limits for a slope of a control variable. Furthermore, the slope constraint setting portion may set upper and lower limits on the slope of the control variable in accordance with a difference between a collected value or a predicted value for the control variable and an upper or lower limits, wherein the upper and lower limits of the slope may be set so as to be non-increasing with an increase in this difference. Moreover, the slope constraint setting portion may set the lower limit for the slope to zero when the collected value for predicted value for the control variable matches the lower limit thereof, and may set the upper limit of the slope to zero when the upper limit matches.

In this optimizing device, the slope constraint setting portion may set, as a constraint, a penalty function in relation to a slope of a control variable. Moreover, the slope constraint setting portion may set a penalty function in accordance with a difference between a collected value or predicted value for a control variable and an upper or lower limit thereof, wherein, when the collected value or predicted value is within the upper and lower limits, the value of the penalty function may be larger the smaller the difference, relative to an identical magnitude of slope.

In the optimizing device set forth above, a parameter for adjusting an operation may be set in the slope constraint setting portion.

An optimizing method according to the present invention includes: a data collection step for collecting data for a control object including a manipulated variable used in controlling the control object and a control variable for outputting the control object; a model storing step for storing a mathematical model of the control object; a future predicting step for predicting a value, for after a prescribed time, for at least a control variable that does not include an output of an integrating element, from among the optimization object variables that are objects of optimization, from among the data collected in the data collecting step; an integrating system slope predicting step for predicting a magnitude of change per unit time, after a prescribed time, for a control variable that includes an output of an integrating element; a variable constraint setting step for setting a constraint for a value, after a prescribed time, for an optimization object variable; a slope constraint setting step for setting a constraint for a magnitude of change, after a prescribed time, for a control variable that includes an output of an integrating element; and a solution calculating step for calculating an optimal solution for the optimization object variable for satisfying a constraint set in the variable constraint setting step and the slope constraint setting step and for optimizing an applied optimization evaluating function; wherein: the slope constraint setting step changes a slope constraint depending on a collected value or a predicted value for a control variable for which a slope constraint is set, to set, when the possibility of the control variable going outside of the constraints that are set by the variable constraint setting portion is low, to a slope constraint that is more relaxed than a slope constraint when the possibility is high.

As explained above, the present invention provides the superior effect of enabling appropriate control depending on the actual characteristics of the control object.

BRIEF DESCRIPTIONS OF THE DRAWINGS

DETAILED DESCRIPTION

Forms for carrying out the present disclosure will be explained below in reference to the figures.

The principle, and the like, behind the present invention will be explained first. The real purpose for steady-state target value optimization of a process is that of reducing an optimization evaluating function while keeping the control variables and manipulated variables from deviating to the outside of designated upper and lower limit values. The means for keeping the slope of the control variable that includes the integrating system to be zero or adequately small, when using the conventional technology, are sufficient conditions, in terms of the aforementioned target, but not necessary conditions. Moreover, in an example such as described above, the condition of having the slope of the control variable that includes the integrating system be zero can be considered to be too restrictive, more than is necessary.

Figure 1:
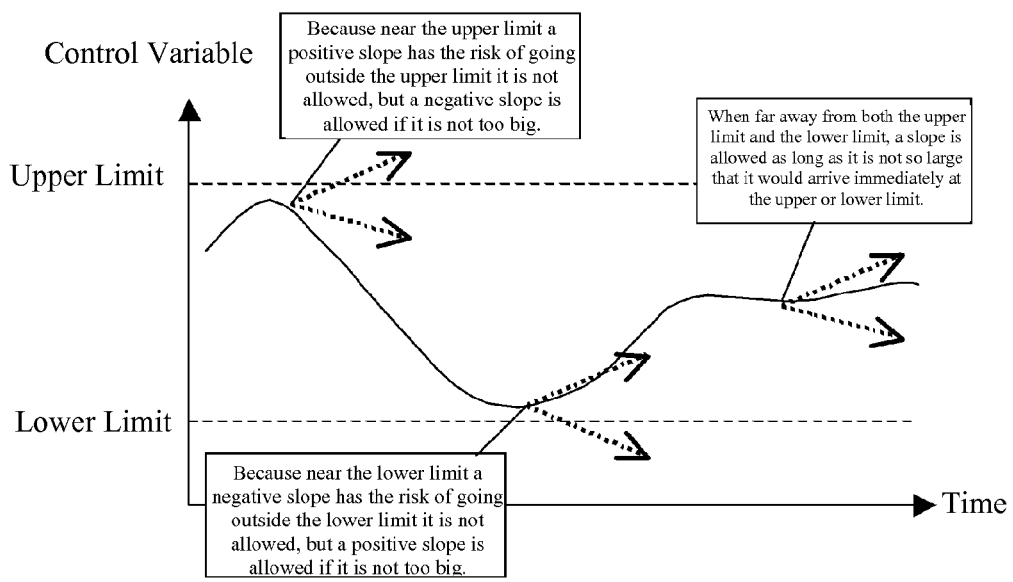
FIG. 1 is an explanatory diagram for explaining the principle behind the present invention.

If, as illustrated in FIG. 1, the current value, or the future predicted value, of a control variable that includes an integrating system is adequately far from designated upper and lower limits, then there is no need for the slope to be zero. Insofar as the slope is not large, such as would arrive quickly at the upper or lower limit, then it is possible to achieve the object without the control variable deviating to the outside of the designated upper and lower limits.

On the other hand, if the current value or future predicted value of a control variable that includes an integrating system is near the upper limit, then having a positive slope (in the direction of increasing the control variable) would mean a high danger of going outside of the upper limit, so this would be difficult to allow. However, if adequately far from the lower limit, then a negative slope (in the direction that reduces the control variable can be allowed. The same can be said for the current value or future predicted value being near to the lower limit, where it would be difficult to allow a negative slope but in some cases a positive slope can be allowed.

When one considers the above, the constraint on the slope is not always necessary. This makes it possible to arrive at the object, that is optimization of the steady-state target value, for the process while maintaining the control variable within the upper and lower limit values, by having the constraints be strict for slopes when there is a high possibility of the control variable that includes the integrating system going outside of the upper or lower limit, even if the constraint is relaxed otherwise.

In the present invention, the steady-state target value is determined so as to suppress a slope in at least the direction that would go outside of the upper or lower limit value when there is a high danger of going outside of the upper or lower limit value, rather than always suppressing the slope for a control variable that includes an integrating system. On the other hand, if there is no danger, then the constraint on the slope can be relaxed more than when there is such a danger, making it possible to avoid a state wherein the optimization does not progress due to the constraint on the slope. Doing this increases the possibility of being able to cause the control variable that has the integrating system, and the target value for the manipulated variable that has a relationship with that control variable, to approach a more desirable value, even in the case that is identified as a problem area in the conventional technology.

Example

Figure 2:
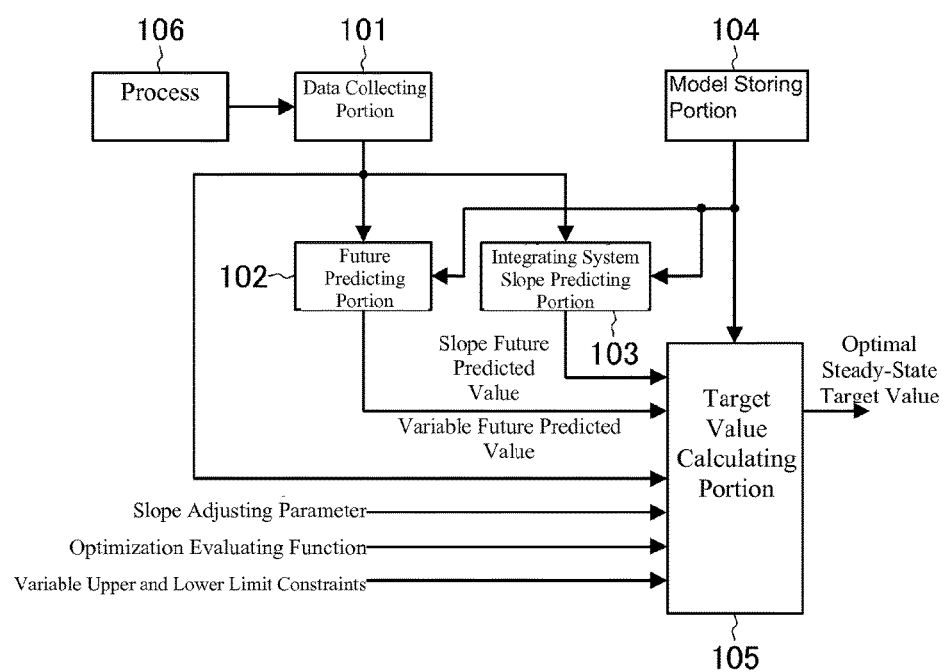
FIG. 2 is a structural diagram illustrating a structure of an optimizing device in Example according to the present invention.
Figure 3:
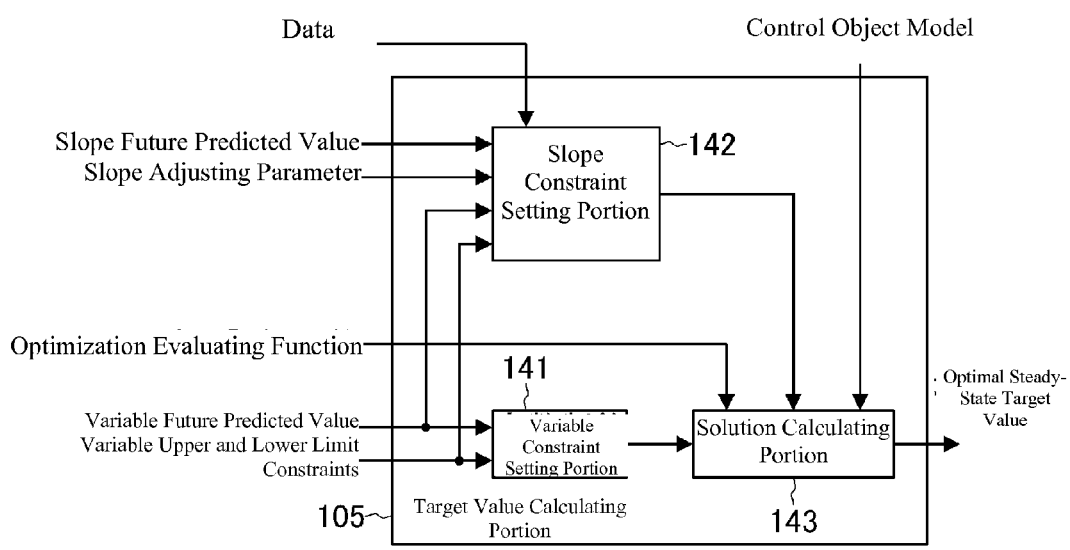
FIG. 3 is a structural diagram illustrating a portion of the optimizing device in the Example according to the present invention.

Example according to the present invention will be explained first using FIG. 2 and FIG. 3. FIG. 2 and FIG. 3 are structural diagrams illustrating a structure of an optimizing device according to the Example according to the present invention. This optimizing device includes: a data collecting portion 101; a future predicting portion 102; an integrating system slope predicting portion 103; a model storing portion 104; and a target value calculating portion 105.

The data collecting portion 101 collects the data that is necessary for predicting the future responses of the process 106, such as the control variables, manipulated variables, noise variables, and the like, from the process 106 that is the control object. These data are sent to the future predicting portion 102 and the integrating system slope predicting portion 103.

The model storing portion 104 stores the mathematical model that is required in order to forecast the behavior of the process 106 and in order to calculate the relationship between the magnitudes of change of the manipulated variables and the magnitudes of change of the control variables. This mathematical model may be, for example, a transfer function model, a state space representation model, a step response model, or the like. Of course, there is no limitation to these models, and other mathematical models may be used instead.

The target value calculating portion 105 calculates target values for optimizing the given optimization evaluating function, through LP or QP, based on the future predicted values for the variables in the process 106, the mathematical model of the process 106, and the upper and lower limit constraints on the variables.

The future predicting portion 102 calculates the future predicted value for the variables to be optimized, as the basis for the target value calculations. For the control variables that are subject to optimization, that is, the control variables that are included in the evaluating function or for which constraints are established, that are control variables that do not include outputs of integrated elements, future predicted values are required. On the other hand, for those control variables that do include outputs of integrating elements, the future predicted values are not essential. However, if there are no future predicted values for these control variables, it is not possible to calculate the values when optimized, and thus they cannot be included in the evaluating function. For the manipulated variables, if it is assumed that the current values will continue, there is no need to calculate future predicted values. Summarizing the above, for the future predicting portion 102, carrying out prediction of at least those variables that do not include outputs of integrating elements, of the control variables that are subject to optimization is a required condition.

The process for carrying out prediction of the control variables that do not include outputs of integrating elements will be described next. The future predicting portion 102 predicts the values of the control variables, after a prescribed time, established in advance, in the process 106, assuming that the values of the manipulated variables and noise variables, which are inputted into the process 106, continue as they are presently. This prescribed time preferably is a time that is adequate for the values of the control variables that are subject to prediction to essentially converge into constants. This time can be understood by attempting to calculate the predicted values, or can be determined from the characteristics of the mathematical model that outputs the control variables (for example, a time by which the step response in the model will be within a range of ±2% from the final value). Note that the specific time referenced above may be different for each control variable, or identical times may be applied overall. However, in the latter case, preferably the time for the control variable that is subject to convergence that requires the longest to converge should be used.

A method for calculating the future response of the control variables from the mathematical model that is the control object and from the input time series from the past that is a control object, is described in documents relating to control and modeled predictive control, such as Ohshima. If the time until the future response is essentially constant, or a time that is determined in advance from the characteristics of the mathematical model, is calculated, then this will be the future predicted value of the control variable. If it is possible to calculate, from a time series of the inputs into the object of control in the past and from the mathematical model, the value at which the control variable converges, then the calculated value may be used as the future predicted value. This corresponds to the prescribed time being ∞.

The calculations may be performed in the same way for the case wherein the future predicted values for the control variables that include outputs of integrating elements are required as well. However, the outputs of the integrating elements continue to change insofar as the magnitude of change per unit time, that is, the slope, is not zero, and thus it is not possible to calculate up to the convergence of the value wherein there is a control variable response, nor to determine the prescribed time from the characteristics of the model. Consequently, the aforementioned prescribed time must be determined in advance by the designer or applied from the outside as an adjustment parameter. Note that the prescribed time in this case is preferably longer than the time required for the magnitude of change of the control variable per unit time to essentially converge to a constant value, after a change in a value of the manipulated variable or a noise variable. Moreover, preferably the settings should be about the same as for the prescribed times for those controlled variables which do not include outputs of integrating elements.

Note that there may be cases wherein calculating control variables that include outputs of integrating elements, if integrating elements are included in the characteristics of the transfer from manipulated variables or noise variables to the control variables but there is no inclusion from other variables, that is, cases wherein, in the mathematical model that outputs a control variable, there is a mixture of there being or not being integrating elements depending on the manipulated variables or noise variables that are inputted. When, in this case, the response is calculated using a mathematical model that does not include an integrating element, the calculation is performed up until the response has essentially converged to a constant value, and when calculating the response using a mathematical model that does include an integrating element, it is possible to change how the calculation is performed depending on whether or not there is an integrating element, such as the calculation being up until the point wherein the magnitude of change in the response per unit time has converged to be essentially constant. Of course, regardless of whether or not there is an integrating element, the future response may be calculated up until a prescribed time that is determined in advance, and that value may be used as the future predicted value.

The mathematical model used when calculating the future predicted value may be an impulse response series model, a step response series model, a transfer function, an ARX (Auto Regressive eXogenous) model, a state space representation model, or the like. Of course, there is no limitation to these, and any given model may be used insofar as it is able to forecast the value of a control variable in the future from the time series data of the manipulated variables and noise variables.

The integrating system slope predicting portion 103 predicts the magnitude of change per unit time, that is, the slope, for after a prescribed time has elapsed in the future, for control variables that include outputs of integrating elements. Except for the point that it is the slope rather than the value that is subject to prediction, the calculations by the future predicting portion 102 are the same. The prescribed time preferably is about the same amount of time as required for the slope to converge to an essentially constant value, or longer. Moreover, this prescribed time may be different for each control variable, and may be different from the prescribed times used by the future predicting portion.

In order to calculate, from time series of manipulated variables and noise variables that are inputted into the control object, the slopes of the control variables that are outputted, a model wherein the integrating elements are removed from the mathematical model from the inputs to the outputs may be used. For example, in the case of a transfer function model, the integrating elements are expressed as 1/s in the transfer function, and thus the integrating element can be removed through multiplying by s the transfer functions from the inputs to the outputs, where if a transfer function wherein this is reduced by a common denominator of the numerator and the denominator is calculated, the result will be a model from the input to the slope of the output. This model can be used to calculate the slope of the control variable.

Along with this, it is possible to once calculate the future response of the control variable up until a prescribed time has elapsed using the future predicting portion 102 and a similar method, or to calculate the magnitude of variation per unit time, to obtain the predicted value for the slope of the control variable.

The details of the target value calculating portion 105 will be explained next using FIG. 3. The target value check exiting portion 105 includes a variable constraint setting portion 141, a slope constraint setting portion 142, and a solution calculating portion 143. Of the inputs into the target value checking portion 105, the control object model, the optimization evaluating function, and the variable upper and lower limit constraints are the same as in the conventional technology. The future predicted value for the slope is a value calculated by an integrating system slope predicting portion 103, and is a generalization of the integrating system steady-state slope predicted value described in the conventional technology. If the prescribed time in the integrating system slope predicting portion 103 is sufficiently longer than the time required for the slope of the control variable to become essentially constant, then there will be no difference from the integrating system steady-state slope predicted value described in the conventional technology.

The variable future predicted values, similarly, are generalizations of the variable steady-state predicted values described in the conventional technology, and are the same insofar as the prescribed time is adequately long. Although the slope adjusting parameters will be described later, they are not essential in executing the present invention. Moreover, if necessary the data that is collected from the control object can use, for example, the current values of the control variables, but are not essential.

The variable constraint setting portion 141 sets constraints for the manipulated variables and control variables. Fundamentally this is the same as in the conventional technology, and the upper and lower limits that are not to be exceeded (hard constraints) are typically as indicated in Equation (5).

The slope constraint setting portion 142 sets constraints for the slopes for the control variables that include integrating systems. While this corresponds to the slope upper and lower limit setting portion and slope penalty setting portion in the conventional technology, the point that the constraint settings change depending on the possibility of the control variable that includes the integrating system going outside of an upper or lower limit differs from the conventional technology.

Figure 4:
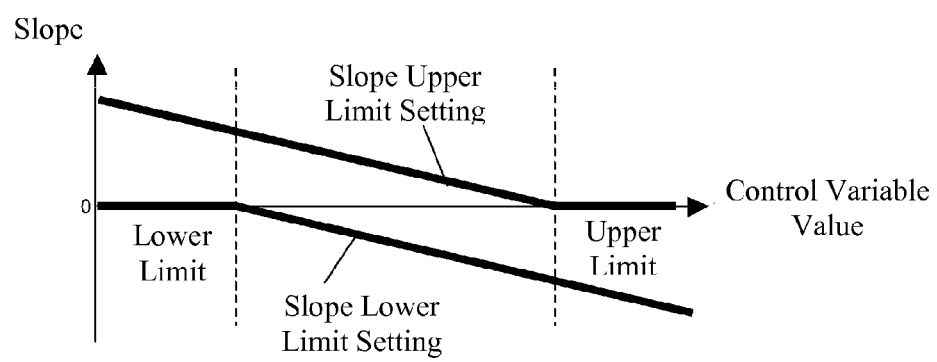
FIG. 4 is an explanatory diagram for explaining regarding setting of the upper and lower limits on the slope in accordance with a difference between the current value of a control variable that includes an operating system and the upper limit value or lower limit value.

Multiple examples will be explained below. As one example, there is a method wherein the upper and lower limits for a slope are set depending on the difference of the current value for the control variable that includes the integrating system from the upper limit or the lower limit. This is a method wherein, if the current value of the control variable is near to the upper limit, the upper limit for the slope is set to near zero and the upper limit for the slope away from the upper limit is relaxed. As a simple method, there is a method for determining the upper and lower limits wherein the upper and lower limits on the slope are set proportional to the difference between the current value and the upper limit and the difference between the current value and the lower limit, as illustrated in FIG. 4. When expressed as an equation, it appears as in Equation (15), below. In Equation (15), c is a positive bounded constant.

Expression 13

$$\min(0, c(\underline{y_i}(k) - y_i(k))) \leq y_i^{(SL)} \leq \max(0, c(\overline{y_i}(k) - y_i(k))) \quad (15)$$

Given these constraints, if the current value $y_i(j)$ of the control variable is at or lower than the lower limit, the lower limit of the slope is set to zero, so the optimal target value is not set so that a negative slope is produced. On the other hand, if $y_i(j)$ is much greater than the lower limit, then the lower limit of the slope will be a negative value, thus allowing an optimal target value such as will produce a negative slope. There will be a similar operation in regards to the upper limit as well. Doing this makes it possible to achieve a behavior wherein the constraint on the slope is strict if the current value of a control variable is near to the upper or lower limit so that there is a high danger of going outside of the limit, and in other states the constraint is relaxed.

Note that while in the example set forth above, the upper and lower limits on the slope were set using the current values for the control variables and differences thereof from the upper and lower limits, but the currently predicted values may be used instead of the current values, or future predicted values they also be considered.

Moreover, the constant c may be a value that is different for the upper limit and for the lower limit of the slope. One may consider a method wherein, when there is a difference in the risks of the control variables going outside of the limits for the upper limits and the lower limits, for example, if even though for the upper limit there is some small overage but there is no immediate danger and there is a large effect on safety of the device in terms of going below the lower limit, then c may be large for the upper limit for the slope and may be set to be small for the lower limit for the slope.

Moreover, one may consider applying a more complex function, such as a square function or taking a square root, rather than having the upper and lower limits for the slope be simply proportional to the differences between the current value and the upper and lower limits. However, insofar as the technological concept of the present invention is taken into consideration, preferably the upper and lower limits for the slope are set so as to be more relaxed the greater the aforementioned differences. Moreover, it is possible that the effects will not be produced if not set in this way. That is, if the upper and lower limits on the slope are expressed by a given function q, and it is as expressed by Equation (16), below, preferably q has the characteristics indicated in Equation (17), below.

Expression 14

$$-q(y_i(k) - \underline{y_i}(k)) \leq y_i^{(SL)} \leq q(\overline{y_i}(k) - y_i(k)) \quad (16)$$

$$x_1 < x_2 \rightarrow q(x_1) \leq q(x_2) \quad (17)$$

Figure 5:
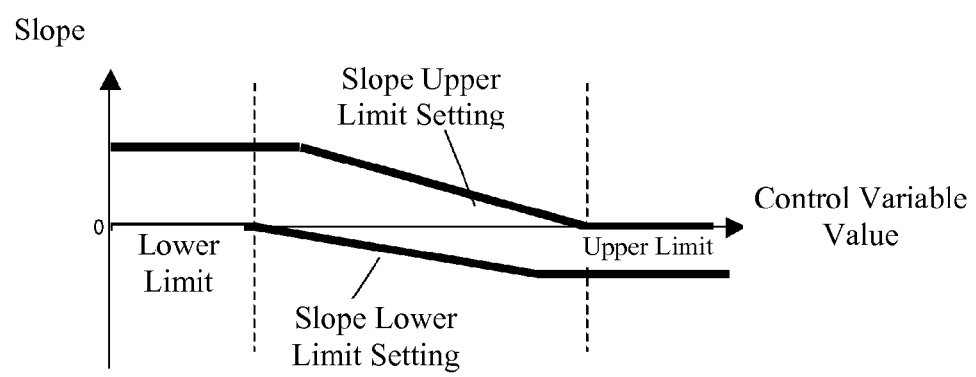
FIG. 5 is an explanatory diagram for explaining regarding setting limits so that the upper and lower limits of the slope will not be greater than a constant value.

Explaining further, when the current value of the control variable, or the current predicted value or the future predicted value arrives at the upper or lower limit, then the slope in the direction that would go outside of the limits should not be allowed, and thus preferably x is 0, or, if a negative value, q(x) is 0. Doing this produces an optimal target value wherein only zero or less is allowed for the slope if the control variable is at or above the upper limit. Moreover, if there is no separate limit on the magnitude of the slope, then one may consider a method wherein, as illustrated in FIG. 5, there are limits wherein the upper and lower limits of the slope will not exceed constant values.

Figure 6:
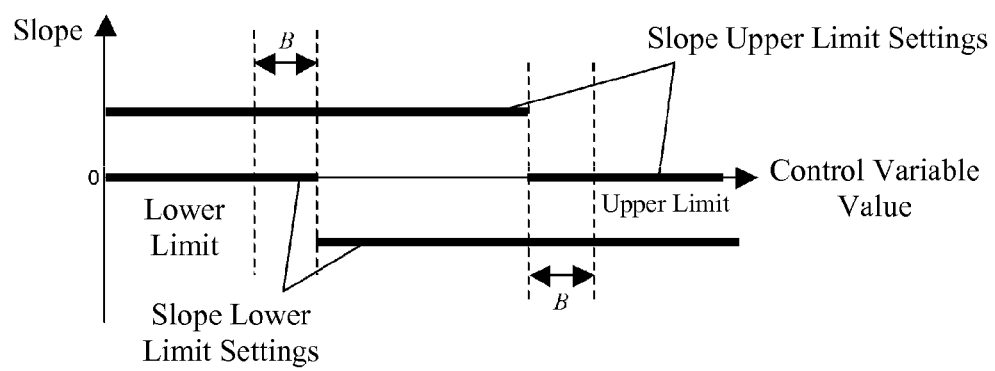
FIG. 6 is an explanatory diagram for explaining settings wherein the upper and lower limits of the slope have been switched, in two stages, to prescribed states.

As a simpler method, one may consider a method wherein the upper and lower limits for the slope are switched in two stages as in Equation (18), below, as illustrated in FIG. 6. In this method, slopes for the control variables are allowed such that the differences between the current value of a control variable and the upper and lower limits thereof are up to a constant B, and if the control variable is nearer to the upper and lower limits, beyond that, then there is a switch to a setting wherein that slope is not allowed. However, in the case of this method, the constraint on the slope is more severe the nearer the control variable is to the upper or lower limit, and thus there is still the possibility of room for optimization, because the constraints are not as tight as in the conventional technology.

Expression 15

$$y_i^{(SL)} \geq \begin{cases} -c, & y_i > \underline{y_i} + B \\ 0, & y_i \leq \underline{y_i} + B \end{cases} \quad (18)$$

$$y_i^{(SL)} \leq \begin{cases} c, & y_i < \overline{y_i} - B \\ 0, & y_i \geq \overline{y_i} - B \end{cases}$$

$$B > 0, c > 0$$

The method for setting the upper and lower limits of the slope in accordance with the difference between the current value of the control variable that includes an integrating system and the upper limit or lower limit will be explained, as an example of a slope constraint setting portion 142, using a plurality of examples. The common points in these examples is the upper and lower limits of the slope either being reduced in accordance with an increase in the difference, or remaining unchanged, depending on the difference wherein the upper or lower limit is subtracted from the collected value or predicted value of the control variable. In other words, the common characteristic is that the upper and lower limits of the slope do not increase with an increase in the difference, that is, they are non-increasing.

As another method for achieving the slope constraint setting portion 142, there is also a method wherein the size of the penalty for the slope of a control variable that includes an integrating system is set in accordance with the difference between the value of the control variable and the upper or lower limit. For example, the penalty shown in Equation (19), below, is set instead of Equation (11).

Expression 16

$$P(\Delta x) = \sum_{i=1}^{n} p(y_i - \underline{y_i}, \overline{y_i} - y_i) \cdot \left(y_i^{(SL)}\right)^2 \quad (19)$$

Figure 7:
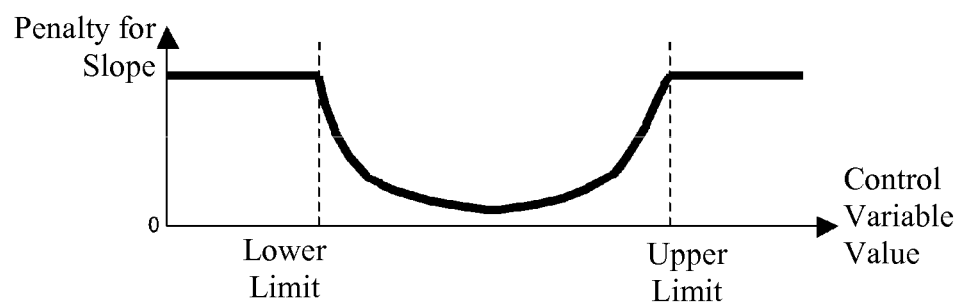
FIG. 7 is an explanatory diagram for explaining a coefficient p for multiplying the slope for a penalty in relation to the slope of a control variable that includes an integrating system.

While having the penalty be proportional to the square of the slope is the same as in the conventional technology, having the coefficient p, by which this is multiplied, change in accordance with the difference between the value of the control variable and the upper or lower limit, rather than being a constant, is different. As illustrated in FIG. 7, the coefficient p assumes a large value if the control variable is near to the upper or lower limit, and assumes a small value otherwise. Doing this suppresses the slope when the value of the control variable is near to the upper or lower limit, to suppress going outside of the upper and lower limits, while allowing a slope other, thus creating room for further optimization.

While up to this point a method has been described that uses upper and lower limits on the slope, and a method has been described that uses a penalty function, as methods for achieving desirable effects through the slope constraint setting portion 142, the present invention can be embodied through either method. Moreover, a combination of both is also possible. As one example, a method wherein a penalty is applied in accordance with the magnitude with which the upper and lower limits on the slope are widened is quantified is shown in Equation (20), below. Instead of allowing the upper and lower limits on the slope to be widened by $\varepsilon_i$, shown in Equation (15), a penalty function in accordance with the square of the magnitude of the width is established. Similar to Equation (19), this penalty function is dependent on how near the current value of the control variable is to the upper and lower limits thereof Expression 17

$$\min(0, c(\underline{y_i}(k) - y_i(k))) - \varepsilon_i \leq y_i^{(SL)} \leq \max(0, c(\overline{y_i}(k) - y_i(k))) + \varepsilon_i \quad (20)$$

$$P(\Delta x) = \sum_{i=1}^{n} p(y_i - \underline{y_i}, \overline{y_i} - y_i) \cdot (\varepsilon_i)^2$$

$$\varepsilon_i \geq 0$$

The various types of constraints, models for control, and applied optimization evaluating functions set/calculated through the processes described above are passed to the solution calculating portion 143, and optimal target values for minimizing the evaluating function wherein all of the variables are within the constraints are calculated.

An example of the series of calculations is given below in the expressions. Firstly, the steady-state predicted value, calculated by the future predicting portion 102, is that which is given by Equation (21), below. These values serve as the base point for optimization.

Expression 18

$$u(k-1) = [u_1(k-1), u_2(k-1), \ldots, u_m(k-1)]^T, \quad (21)$$

$$y(\infty) = [y_1(\infty), y_2(\infty), \ldots, y_n(\infty)]^T,$$

$$x_0 = \begin{bmatrix} u(k-1) \\ y(\infty) \end{bmatrix}$$

Here differential optimization is envisioned, so the control variables y and be manipulated variables u are all as expressed in Equation (22), expressed as differences from the base point.

Expression 19

$$x = x_0 + \Delta x \quad (22)$$

$$x = \begin{bmatrix} u \\ y \end{bmatrix}, \Delta x = \begin{bmatrix} \Delta u \\ \Delta y \end{bmatrix}, \Delta u = [\Delta u_1, \Delta u_2, \ldots, \Delta u_m]^T,$$

$$\Delta y = [\Delta y_1, \Delta y_2, \ldots, \Delta y_n]^T$$

The relationship equations between the slope predicted value $y^{(SL)}(\infty)$, predicted by the integrating system slope predicting portion 103, the difference $\Delta y^{(SL)}$ from this value, and the actual slope $y^{(SL)}$ are as indicated in Equation (23), below. Note that while written in a form that includes all control variables, in order to prevent the expressions from becoming more complex than necessary, those control variables that do not include output of integrating elements are actually ignored (omitted).

Expression 20

$$y^{(SL)}(\infty) = [y_1^{(SL)}(\infty), y_2^{(SL)}(\infty), \ldots, y_n^{(SL)}(\infty)]^T$$

$$\Delta y^{(SL)} = [\Delta y_1^{(SL)}(\infty), \Delta y_2^{(SL)}(\infty), \ldots, \Delta y_n^{(SL)}(\infty)]^T$$

$$y^{(SL)} = [y_1^{(SL)}, y_2^{(SL)}, \ldots, y_n^{(SL)}]^T$$

$$y^{(SL)} = y^{(SL)}(\infty) + \Delta y^{(SL)} \quad (23)$$

For the values of the manipulated variables and the values of the control variables, upper and lower limits are set for the differences from the base point, as shown in Equation (24), below, by the variable constraint setting portion 141.

Expression 21

$$\underline{u_i} - u_i(k-1) \leq \Delta u_i \leq \overline{u_i} - u_i(k-1), \text{ for } i=1, \ldots, m$$

$$\underline{y_i} - y_i(\infty) \leq \Delta y_i \leq \overline{y_i} - y_i(\infty), \text{ for } i=1, \ldots, n \quad (24)$$

The upper and lower limit values for the slope are set in accordance with the differences between the current values of the control variables and the upper and lower limits thereof, and the penalty functions are set, as in Equation (25), below, by the slope constraint setting portion 142.

Expression 22

$$\underline{f_i}\left(y_i^{(SL)}(k), \underline{y}, \ldots\right) - y_i^{(SL)}(\infty) \leq \quad (25)$$

$$\Delta y_i^{(SL)} \leq \overline{f_i}\left(y_i^{(SL)}(k), \overline{y}, \ldots\right) - y_i^{(SL)}(\infty),$$

for $i = 1, \ldots, n$ $$P(\Delta x) = \sum_{i=1}^{n} p\left(y_i^{(SL)}(k), \underline{y}, \overline{y}, \ldots\right)\left(y_i^{(SL)}(\infty) + \Delta y_i^{(SL)}\right)^2$$

The model that is the control object gives the relationships between $\Delta u$ and $\Delta y$, and the relationships between $\Delta u$ and $\Delta y^{(SL)}$. One example is given in Equation (26), below.

Expression 23

$$\Delta y = G_0 \Delta u$$

$$\Delta y^{(SL)} = S \Delta u \quad (26)$$

The given evaluating function $J(\Delta x)$, corrected evaluating function $J_{modified}(\Delta x)$, and optimization problem solved by the solution calculating portion 143 are shown in Equation (27), below.

Expression 24

$$J(\Delta x) = \Delta x^T H \Delta x + h^T \Delta x$$

$$J_{modified}(\Delta x) = J(\Delta x) + P(\Delta x)$$

$$\Delta x_{opt} = \arg\min J_{modified}(\Delta x) \quad (27)$$

Where here, arg min $J_{modified}(\Delta x)$ means that the $\Delta x$ that minimizes $J_{modified}(\Delta x)$ is returned.

The solution $\Delta x_{opt}$ that is obtained here is added to $x_0$ to produce the final optimal target value.

Figure 8:
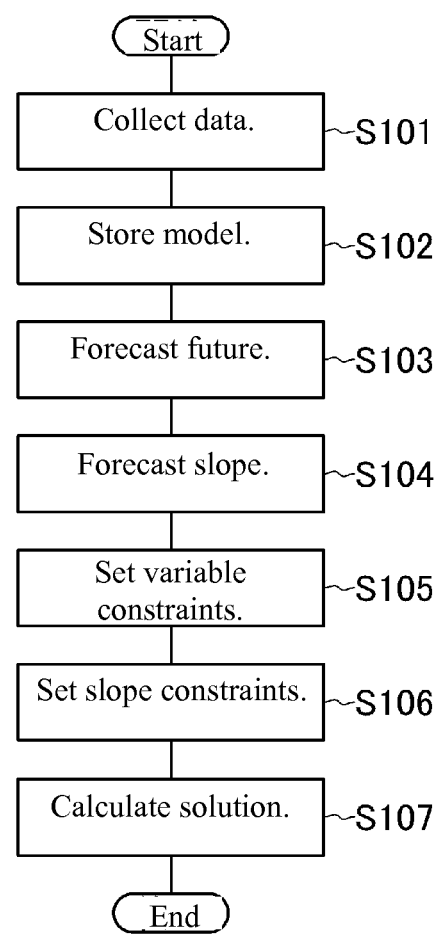
FIG. 8 is a flowchart for explaining the operation (the optimizing method) for the optimizing device in the Example according to the present invention.

Summarizing the above, the operations of the optimizing device (the optimizing method) in the Example of the present invention are as shown in the flowchart in FIG. 8.

First, in Step S101, the data collecting portion 101 collects data that is the control subject, including the manipulated variables that are used in controlling the control subject, and the control variables for outputting the control subject (the data collecting). Following this, in the Step S102, a mathematical model of the control object is stored in the model storing portion 104 (the model storing step).

Following this, in Step S103, the future predicting portion 102 predicts values for after a prescribed time for at least those control variables that do not include an output of integrating elements, from among the variables that are subject to optimization that are the optimization objects, within the data that was collected in Step S101 (the future predicting step)

Following this, in Step S104, the integrating system slope predicting portion 103 predicts the magnitude of change per unit time, after a prescribed time, for the control variables that include an output of an integrating element (the slope predicting step). Following this, in Step S105, the variable constraint setting portion 141 sets constraints for the values, for after a prescribed time, for the variables that are subject to optimization (the variable constraint setting step). Following this, in Step S106, the slope constraint setting portion 142 sets constraints on the magnitudes of change, after a prescribed time, of the control variables that include an output of an integrating element (the slope constraint setting step). Here the slope constraints are varied depending on the collected values or the predicted values for the control variables for which the slope constraints are to be set, where if there is little possibility that a control variable will go outside of the constraints set by the variable constraint setting portion, slope constraints that are more relaxed than the slope constraints when this possibility is high are set.

Following this, in Step S107, the solution calculating portion 143 finds an optimal solution for the variables that are subject to optimization, for satisfying the constraints set in Step S105 and Step S106 and for optimizing the optimization evaluating function that is imposed (the solution calculating step).

Note that the optimizing device is a computer instrument that includes, for example, a CPU (a Central Processing Unit; a central calculating/processing device), a main memory device, an external storage device, a network connecting device, and the like, wherein the various functions described above are achieved through operation of the CPU in accordance with a program that is deployed into the main memory device. Moreover, the individual functions may be distributed over a plurality of computer devices.

Note that in the present invention there is the possibility that the steady-state target value will change when the current value changes. However, this is due to non-linearity in the object process. If the process is nonlinear, this occurs in the techniques described in the conventional technologies as well, so is not a shortcoming that is unique to the present invention.

Another Example

Another Example according to the present invention will be explained next. In the Another Example as well, as illustrated in FIG. 2, a data collecting portion 101, a future predicting portion 102, an integrating system slope predicting portion 103, a model storing portion 104, and a target value calculating portion 105 are provided. Aside from the target value calculating portion 105, this is identical to the Example, described above.

Figure 9:
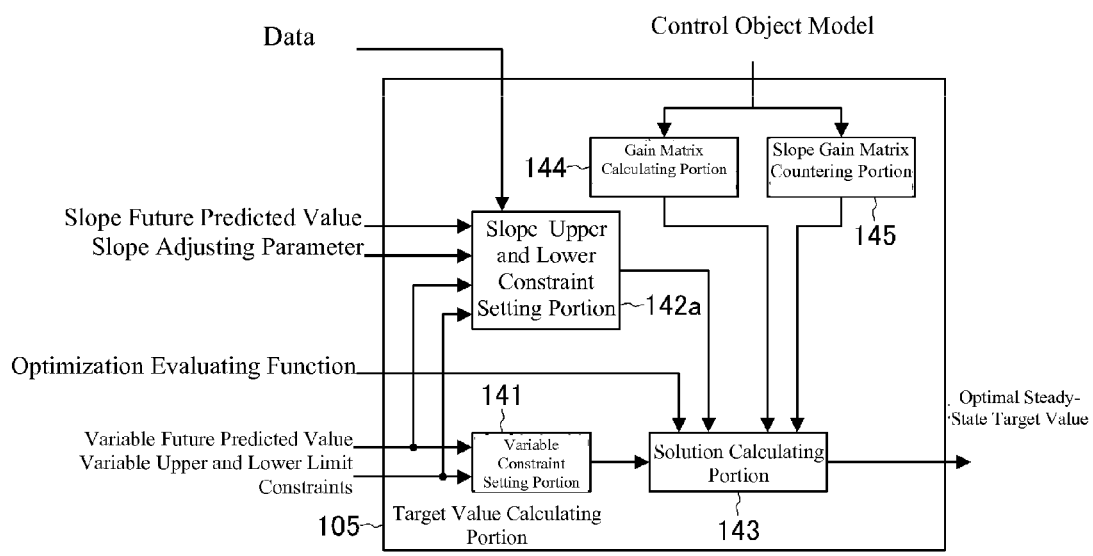
FIG. 9 is a structural diagram illustrating a portion of the optimizing device in Another Example according to the present invention.
Figure 10:
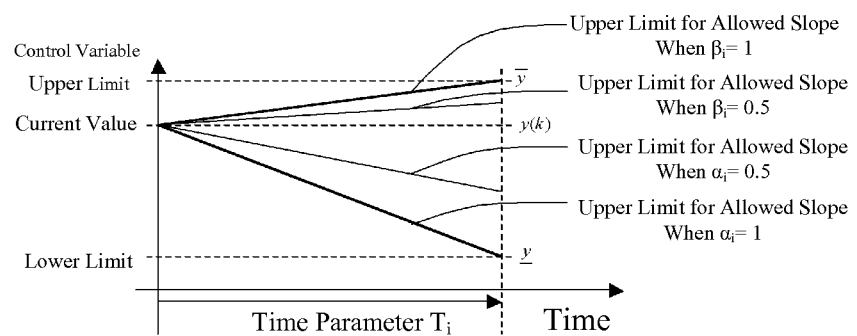
FIG. 10 is an explanatory diagram for explaining the operation of a portion of the optimizing device according to the Another Example according to the present invention.

In the Another Example, as illustrated in FIG. 9, the target value calculating portion 105 includes a slope upper and lower limit setting portion 142a and also includes a gain matrix calculating portion 144 and a slope gain matrix calculating portion 145, not found before. The part that was the slope constraint setting portion 142 in the Example is the slope upper and lower limit setting portion 142a in the Another Example, and the effect of the present invention is achieved through only changing the upper and lower limit settings for the slopes of the control variables. Moreover, while the gain matrix calculating portion 144 and the slope gain matrix calculating portion 145 are added, fundamentally there is no difference from the conventional technology. There are slope adjusting parameters as newly added inputs, used for adjusting the upper and lower limits calculated by the slope upper and lower limit setting portion 142a.

The gain matrix calculating portion 144 and the slope gain matrix calculating portion 145 are for calculating the gain matrix and the slope gain matrix, required by the solution calculating portion 143, from the mathematical model that is stored in the model storing portion 104, where the gain matrix calculating portion 104 calculates the matrix G, which appears in Equation (7), for defining the relationships between the magnitudes of change $\Delta y$ of the control variables and the magnitude of change $\Delta u$ of the manipulated variables.

The slope gain matrix calculating portion 145 calculates a matrix S that defines the relationships between the magnitudes of change $\Delta u$ of the manipulated variables and the magnitudes of change of the slopes of the control variables. For example, if a transfer function $G(s)$ for the control object is stored in the model storing portion 104, then each of these can be calculated by Equation (28), below.

Expression 25

$$G_0 = G(0)$$
$$S = \lim_{s \to 0} sG(s) \quad (28)$$

The variable constraint setting portion 101 is identical to that in the Example. The solution calculating portion 143 is also identical to that in the Example, except for there being no correction to the evaluating function through a penalty function.

The slope upper and lower limit setting portion 142a is for limiting the operation of the constraint setting portion 142 of the Example, and both have the same purpose. Moreover, in the Another Example the slope adjusting parameters can be applied from the outside. The slope adjusting parameters may be such that a single value is set for the target value calculating portion 105 as a whole, or may be settable individually for each individual control variable; however, preferably they can be adjusted for each individual control variable in order to enable handling of a broad range of control objects. For example, a form may be applied wherein the upper and lower limits for the slope can be adjusted, as shown in Equation (29), below, for each individual control variable.

Expression 26

$$\min(0, a_i(\underline{y_i}(k) - y_i(k))) \leq y_i^{(SL)} \leq \max(0, b_i(\overline{y_i}(k) - y_i(k))) \qquad (29)$$

$a_i$ and $b_i$ are slope adjusting parameters applied from the outside. For the control variables for which the slope is to be suppressed, $a_i$ can $b_i$ are set to zero. Doing this makes it possible to obtain optimal target values through always suppressing the slopes of the control variables in the same way as with the conventional technology. On the other hand, for the other variables, $a_i$ and $b_i$ are set to numbers that are larger than zero, and that are not extremely small. When $a_i$ and $b_i$ are set so as to be large, optimization is carried out assertively in the case that was explained in the problem area in the conventional technology. Note that the risk of a control variable going outside of the upper and lower limits is also increased. When $a_i$ and $b_i$ are set to be small, the speed with which optimization advances, in the case described above, will be slow, but the risk of a control variable going outside of the upper and lower limits will be small.

The introduction of slope adjusting parameters in this way strengthens the effects of the present invention, and produces the effect of being able to make adjustments while striking a balance with the risk of a control variable going outside of an upper or lower limit. Moreover, because rather than being constants that are determined by the target value calculating portion 105, they take a form wherein they are applied from the outside, and there is also the effect of the user, who understands the characteristics of the control object, being able to make fine adjustments in accordance with those characteristics.

As another method, there is a method wherein the adjustment is done using Equation (30), below.

Expression 27

$$\min\left(0, \frac{\alpha_i}{T_i}(\underline{y_i} - y_i(k))\right) \leq y_i^{(SL)} \leq \max\left(0, \frac{\beta_i}{T_i}(\overline{y_i} - y_i(k))\right) \qquad (30)$$

Here $y(k)$ is the current value of the $i^{th}$ control variable, and $y_i^{(SL)}$ is the slope of the $i^{th}$ control variable in the steady-state. $T_i$ is a positive parameter relating to time, and $\alpha_i$ and $\beta_i$ are parameters that are greater than or equal to zero. When $\alpha_i$ and $\beta_i$ are set to 1, slopes up to those that would allow the value of the control variable after the time $T_i$ has elapsed to reach the upper and lower limit values are allowed. Moreover, when $\alpha_i$ and $\beta_i$ are set to 0.5, then up to one half of those slopes are allowed. The effect of being able to adjust, as a standard, a time parameter for control (for example, the time for asymptotic approach, a rise time, or the like), even for different control objects, through normalization of the slope adjustment parameters $\alpha_i$ and $\beta_i$ are achieved through introducing a parameter related to time in this way.

Figure 11:
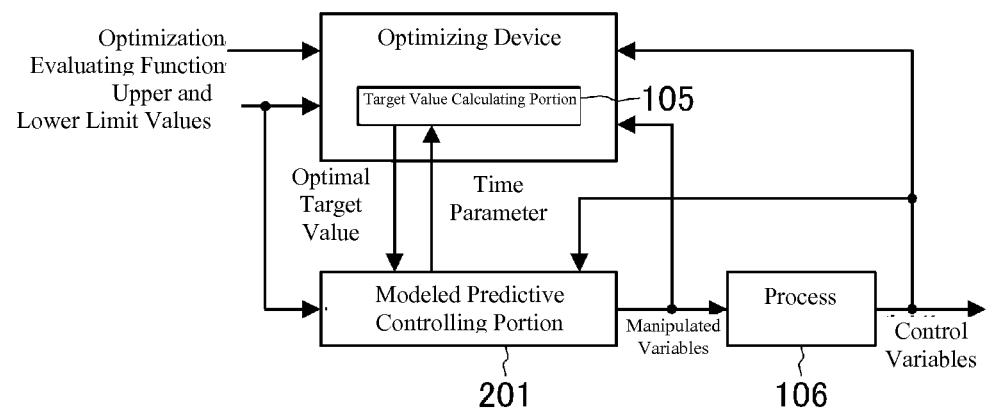
FIG. 11 is a structural diagram illustrating an example of application of the optimizing device according to the Another Example according to the present invention.

Furthermore, as illustrated in FIG. 11, it is also possible to use a time parameter for control, acquired from the modeled predictive controlling portion 201 that performs control toward the target value that is calculated by the target value calculating portion 105, using the $Y_i$. Causing the slope upper and lower limit setting portion 142a of the target value calculating portion 105 to operate linked to the time parameter of the modeled predictive controlling portion 201 has the benefit of enabling the behavior of the target value calculating portion 105 to be adjusted automatically when there is a change in the time parameter for control.

Here, in terms of the method for setting $T_i$, if the time for the control variable to asymptotically approach the target value is applied, or calculated, as the control specification for the modeled predictive controlling portion 201, the easiest approach is to use that value. In this case, having a value greater than 1 for $\alpha_i$ or $\beta_i$ is, in terms of practical implementation, undesirable because this allows a slope that will allow the target value to go outside of the upper or lower limit prior to the time for the asymptotic approach. Consequently, it can be said that preferably $\alpha_i$ and $\beta_i$ should be set within the range of 0 to 1.

Note that while in the above the controlling portion for controlling in the direction of the target value was explained as a modeled predictive controlling portion, there is no limit thereto. Insofar as there is a controlling portion for controlling toward the target value and a parameter relating to time for control can be acquired, the technique explained here can be applied. Conversely, it cannot be applied if it is not possible to acquire a parameter in relation to the time for control, even if the controlling portion is a modeled predictive controlling portion.

Yet Another Example

Yet Another Example according to the present invention will be explained next. In the Another Example as well, as illustrated in FIG. 3, a data collecting portion 101, a future predicting portion 102, an integrating system slope predicting portion 103, a model storing portion 104, and a target value calculating portion 105 are provided. Aside from the target value calculating portion 105, this is identical to the Example and Another Example, described above.

Figure 12:
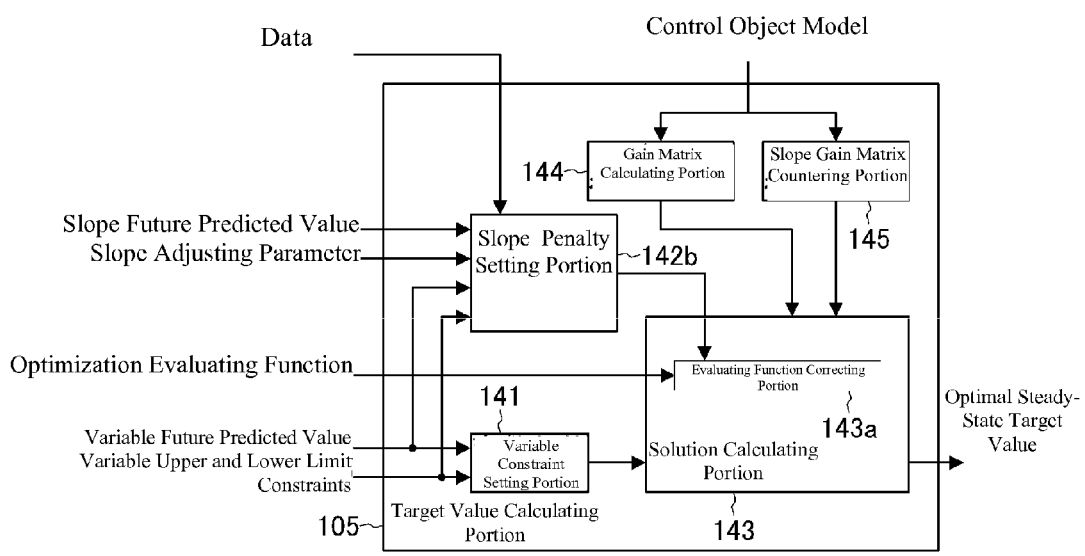
FIG. 12 is a structural diagram illustrating a portion of the structure of an optimizing device according to Yet Another Example according to the present invention.
Figure 13:
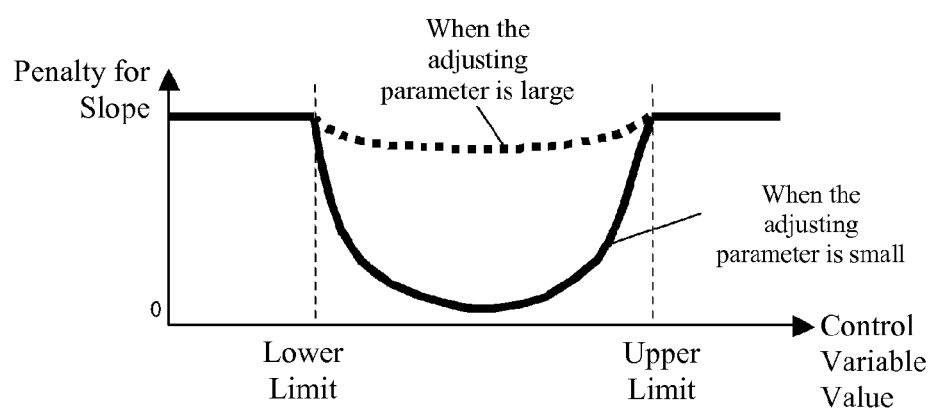
FIG. 13 is an explanatory diagram for explaining an adjustment to the penalty function.

In the Yet Another Example, as illustrated in FIG. 12, the target value calculating portion 105 includes a slope penalty setting portion 142b. Moreover, the solution calculating portion 143 includes an evaluating function correcting portion 143a. The other structures are identical to those in the Another Example.

The part that was the slope constraints setting portion 142 in the Example is the slope penalty setting portion 142b in the Yet Another Example. In the Yet Another Example, the effect is produced through only applying penalties to the slopes of the control variables, by the slope penalty setting portion 142b. The gain matrix calculating portion 144 and the slope gain matrix calculating portion 145 are the same as those in the Another Example.

Additionally, the addition of an evaluating function correcting portion 143a for correcting the evaluating function based on the penalty set by the slope penalty setting portion 142b in the solution calculating portion 143 is different from the Example. Moreover, a slope adjusting parameter is received as an adjustable parameter for the slope penalty setting portion 142*b*.

In the Yet Another Example, constraints on the slopes of control variables that include integrating systems are set as penalty functions on the magnitudes of the slopes. These penalties are added, by the evaluating function correcting portion 143*a*, to the original optimization evaluating function that is applied from the outside. The solution calculating portion 143 calculates the solution that optimizes the evaluating function to which the penalties have been added.

An example of a method for adjusting the penalty functions through the slope adjustment parameters is illustrated below. For example, the penalty function is set as shown in Equation (31), below.

Expression 28

$$P(\Delta x) = \sum_{i=1}^{n} \gamma_i p(y_i - \underline{y_i}, \overline{y_i} - y_i) \cdot \left(y_i^{(SL)}\right)^2 \quad (31)$$

In Equation (31) $\gamma_i$ is a slope adjusting parameter. When the parameter $\gamma_i$ is set so as to be large, the penalty function will be large, even given the same square of the magnitude of the slope, and thus there is a large effect of suppressing the slope of the control variable. When the parameter γi is set so as to be small, the effect of allowing a slope is increased.

Figure 14:
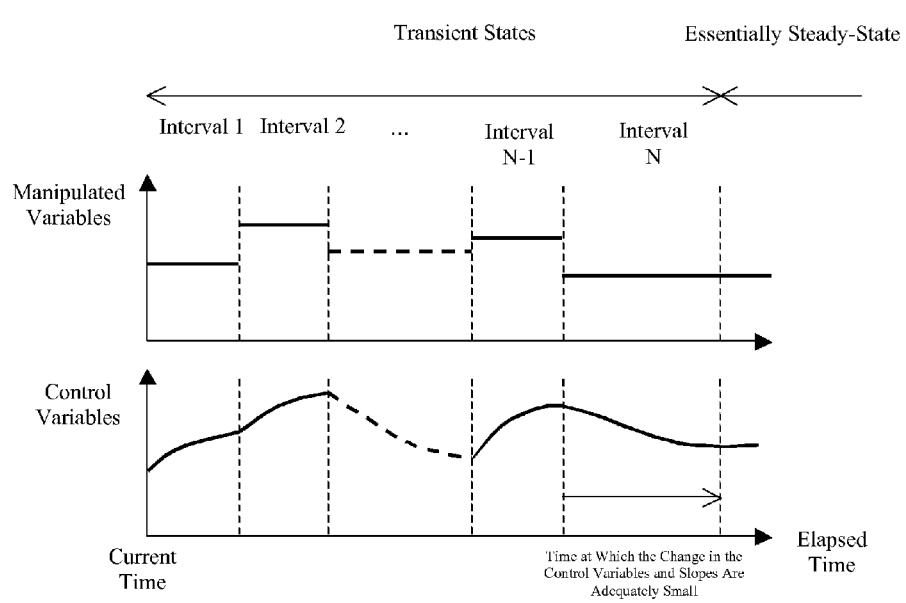
FIG. 14 is an explanatory diagram illustrating a state wherein the transitory state prior to arriving at the steady-state is divided into a plurality of intervals.
Figure 15:
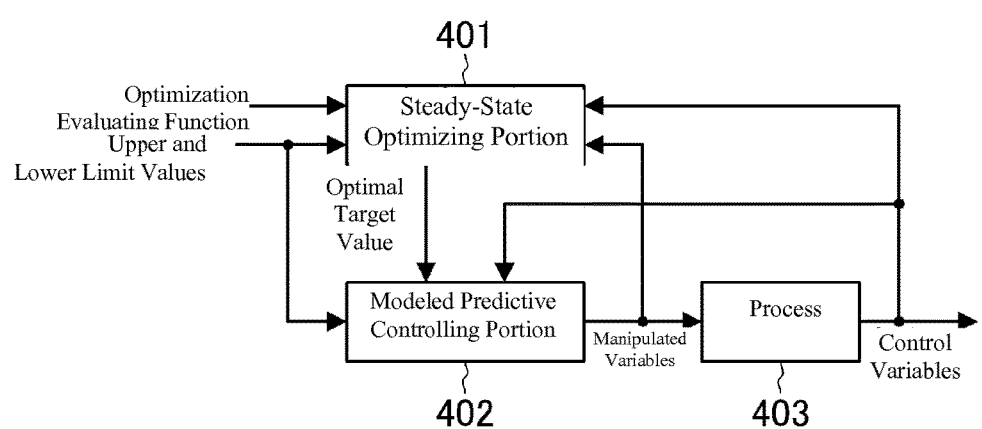
FIG. 15 is a structural diagram illustrating a structure of a system for carrying out multivariable modeled predictive control.
Figure 16:
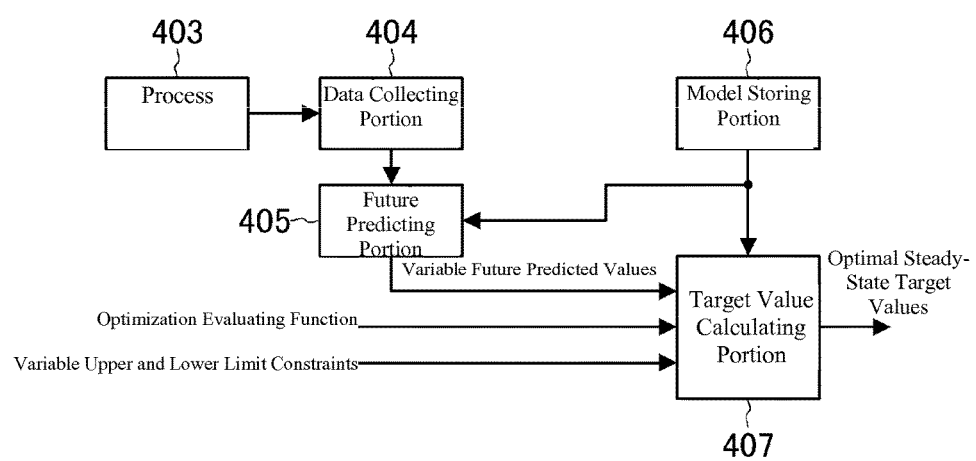
FIG. 16 is a structural diagram illustrating a structure of a steady-state optimizing portion.
Figure 17:
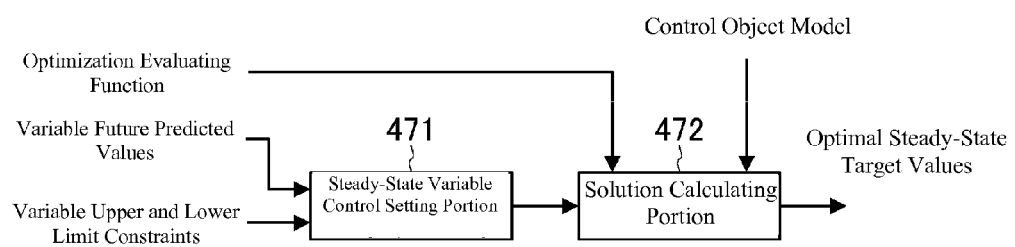
FIG. 17 is an explanatory diagram for explaining a method for carrying out optimization for a difference from a base point, with the values of the variable in the steady state as the base point.
Figure 18:
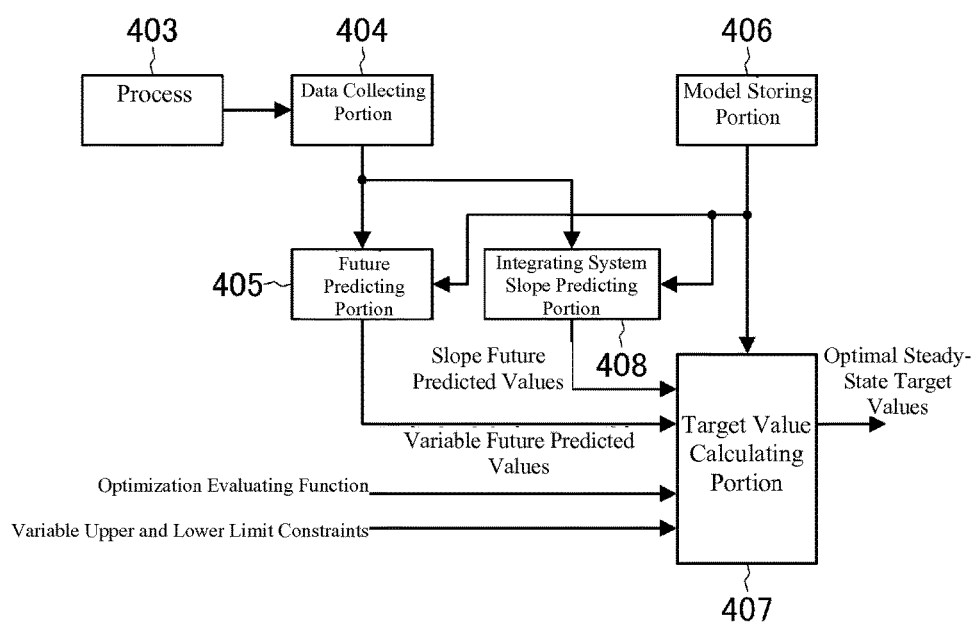
FIG. 18 is a structural diagram illustrating the structure of a steady-state optimizing portion wherein a parameter for causing the slope of a control variable that includes an integrating system to be zero is included.
Figure 19:
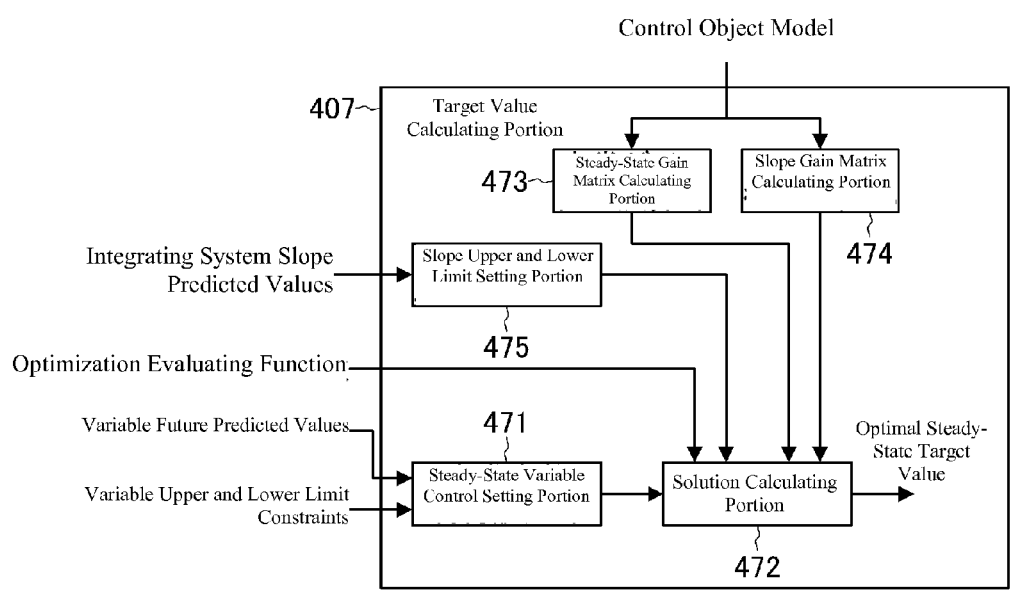
FIG. 19 is a structural diagram illustrating a structure of a target value calculating portion 407.
Figure 20:
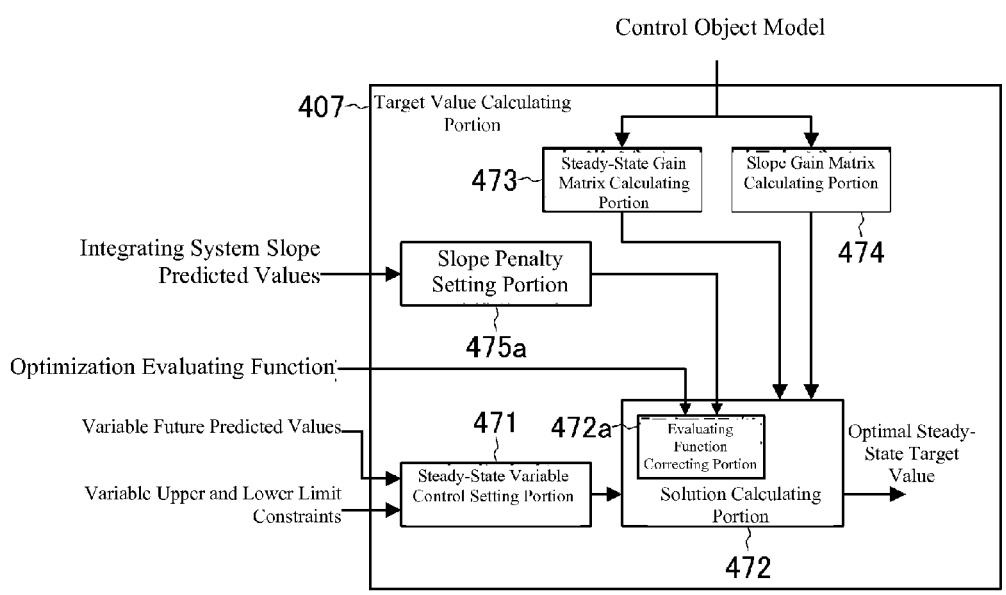
FIG. 20 is a structural diagram illustrating a structure of another target value calculating portion 407.
Figure 21:
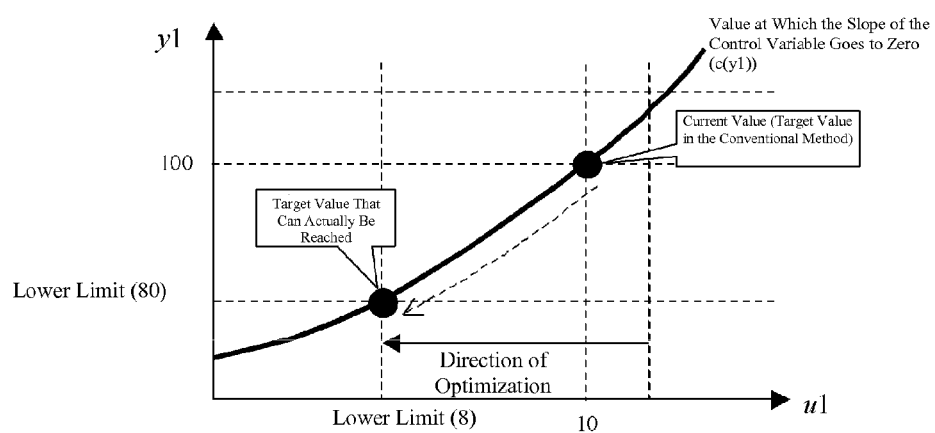
FIG. 21 is an explanatory diagram illustrating one example of characteristics of the object process.

As another method for making an adjustment, there is a method wherein the difference between the maximum value and the minimum value for the penalty function is changed, as illustrated in FIG. 14. The maximum value for the penalty function is not dependent on the parameter, and thus the effect of suppressing the slope when the value of the control variable is near an upper or lower limit does not change much even if the parameter is small. On the other hand, when the value of the control variable moves away from the upper and lower limits, then the smaller the parameter the greater the effect of allowing the slope. As a result, the smaller the parameter the more assertive the optimization, even when a slope is allowed.

Note that the present disclosure is not limited to the examples set forth above, but rather, of course, many changes and combinations can be made by one of ordinary skill in the art, within the range of the technical concept of the present disclosure. While in the above the optimization object was only for the steady-state or for a state wherein the change in the value or the slope of the control variable has become adequately small, the application of the present invention is not limited thereto.

For example, the present invention may be applied also to a case wherein the transient state prior to reaching the steady-state is divided into a plurality of intervals, and the values of the manipulated variables and control variables, and the slopes of the control variables, in each of the intervals, are included in the optimization object. In this case, in the slope constraint setting portion 142, constraints must be set for the slopes of at least those control variables that include integrating systems, in the steady-state (at the time wherein the interval began in FIG. 14 has been completed). On the other hand, for the various intervals in the transient states, there is not necessarily the need to set constraints on the slopes.

The invention claimed is:

1. An optimizing device, comprising:
processing circuitry configured to receive data on a control object, the received data including at least a manipulated variable used in controlling the control object and a control variable output from the control object; and a memory that stores a mathematical model of the control object, wherein the processing circuitry is further configured to
predict a value based on the received data, after a first prescribed time, for at least a first control variable that is not an output of an integrating element, wherein the first control variable is one of optimization object variables, the optimization object variables are variables that are subject to optimization;

predict a magnitude of change per unit time, after a second prescribed time, for a second control variable that is an output of an integrating element;

set a constraint for a value of a variable that is an optimization object variable, after a third prescribed time;

set a slope constraint which is a constraint on the magnitude of change after a fourth prescribed time for the second control variable;

calculate an optimal solution for the variables that are subject to optimization, wherein the optimal solution satisfies the set constraints, and optimizes an optimization evaluating function that is applied;

change a slope constraint depending on a collected value or a predicted value for a constrained control variable for which the slope constraint is set, so as to set, when a possibility of the constrained control variable going outside of the set constraints is low, a first slope constraint that is more relaxed than a second slope constraint when the possibility is high; and control the control object based on the calculated optimal solution.

2. The optimizing device as set forth in claim 1, wherein the processing circuitry is further configured to set, as constraints, upper and lower limits for a slope of the constrained control variable.

3. The optimizing device as set forth in claim 2, wherein the processing circuitry is further configured to set upper and lower limits on the slope of the constrained control variable in accordance with a difference between the collected value or the predicted value for the constrained control variable and upper or lower limits, wherein the upper and lower limits of the slope are set so as to be non-increasing with an increase in the difference.

4. The optimizing device as set forth in claim 2, wherein the processing circuitry is further configured to set the lower limit for the slope to zero when the collected value or the predicted value for the constrained control variable matches the lower limit thereof, and sets the upper limit of the slope to zero when the collected value or the predicted value for the constrained control variable matches the upper limit.

5. The optimizing device as set forth in claim 1, wherein the processing circuitry is further configured to set, as a constraint, a penalty function in relation to a slope of the constrained control variable.

6. The optimizing device as set forth in claim 5, wherein the processing circuitry is further configured to set a penalty function in accordance with a difference between the collected value or the predicted value for the constrained control variable and an upper or lower limit thereof, wherein, when the collected value or the predicted value is within the upper and lower limits, the value of the penalty function is larger the smaller the difference, relative to an identical magnitude of slope.

7. The optimizing device as set forth in claim 1, wherein the processing circuitry is further configured to set a parameter for adjusting an operation.

8. An optimizing method, comprising:
collecting data for a control object, the data including at least a manipulated variable used in controlling the control object and a control variable output from the control object;
storing a mathematical model of the control object;
predicting a value based on the collected data, after a first prescribed time, for at least a first control variable that is not an output of an integrating element, wherein the first control variable is from among optimization object variables, the optimization object variables are variables that are subject to optimization;
predicting a magnitude of change per unit time, after a second prescribed time, for a second control variable that is an output of an integrating element;
setting a constraint for a value, after a third prescribed time, for each optimization object variable;
setting a slope constraint which is a constraint for a magnitude of change, after a fourth prescribed time, for the second control variable;
calculating an optimal solution for the optimization object variables, wherein the optimal solution satisfying the set constraints and optimizing an applied optimization evaluating function; and
controlling the control object based on the calculated optimal solution, wherein
setting the slope constraint includes changing the slope constraint depending on a collected value or a predicted value for a constrained control variable for which the slope constraint is set, so as to set, when a possibility of the constrained control variable going outside of the set constraints is low, to a first slope constraint that is more relaxed than a second slope constraint when the possibility is high.

* * * * *